United States Patent [19]

Dahlinger

[11] 3,723,756
[45] Mar. 27, 1973

[54] HIGH EFFICIENCY CURRENT FEEDBACK CONTROL SYSTEM

[75] Inventor: Rodney J. Dahlinger, Canoga Park, Calif.

[73] Assignee: Hughes Aircraft Company, Culver City, Calif.

[22] Filed: Feb. 9, 1972

[21] Appl. No.: 225,004

[52] U.S. Cl. .................................. 307/106, 307/260
[51] Int. Cl. ................................................. H03k 3/00
[58] Field of Search ...... 307/260, 106, 270, 282, 107, 307/108, 109; 328/65

[56] References Cited

UNITED STATES PATENTS 3,668,435  6/1972  Farnsworth et al. .................. 307/260

Primary Examiner—Robert K. Schaefer
Assistant Examiner—M. Ginsburg
Attorney—W. H. MacAllister, Jr. et al.

[57] ABSTRACT

A high efficiency power switching system for charging loads by repetitively switching a power source to a load with the system reliably operating over relatively large load current variations. The switching system utilizes a proportion of the main switching transistor collector current to provide an efficient and rapidly responsive control of the base current to that transistor. The collector current is initially stepped down through a first transformer to a lower level to decrease the saturation loss of the switching transistor and of the controlling devices and is then stepped back up through a second transformer to the level required for efficient base drive up the main transistor. The controlling devices are periodically turned on and off and during the storage time of the main transistor a current proportional to the collector current is removed from the base of that transistor to reduce its storage time and decrease its turn off time. The system features provide an efficiently controlled main transistor and a highly efficient charging system.

10 Claims, 2 Drawing Figures

HIGH EFFICIENCY CURRENT FEEDBACK CONTROL SYSTEM

BACKGROUND OF THE INVENTION

1. Field of the Invention

This invention relates to high power transistor switching circuits and more particularly to a high efficiency switching circuit for charging loads such as pulse forming networks.

2. Description of the Prior Art

In some power supplies operating to charge a load, high efficiency is required over a very large range of current variation and over a very large number of switching operations. For example, in a fly-back type pulse forming network being charged from a power supply the collector current of the main switching transistor is a ramp rather than a rectangular current pulse. If a sufficient base current were continuously supplied to maintain saturation of the transistor for the maximum current condition, then during a large percentage of the on period of the transistor the base is significantly over-driven and power is wasted. In a similar manner, when charging loads that utilize a rectangular current pulse, variations of the current level both at the leading and trailing edges of the pulses and at the peak of the pulse result in substantial inefficiency if the switching transistor is maintained at saturation. One of the most efficient switching systems or charging systems of the prior art is a Darlington type current feedback system of U.S. Pat. No. 3,668,435 Robert P. Farnsworth and Rodney J. Dahlinger, issued June 6, 1972, entitled EFFICIENCY PULSE FORMING NETWORK CHARGING SYSTEMS and assigned to a common assignee. The system utilizes a current feedback transformer, the secondary of which is connected to the base of the switching transistor through a series transistor. This referenced system requires separate circuitry to pull negative current out of the base of the switching transistor for fast turn-off and provides an inefficient turn-off operation. Also, the system does not provide for DC (direct current) isolation of the control circuitry from the main power supply. Another prior art system for charging the load is an SCR (Silicon Controlled Rectifier) switch controlling a ferro-resonant transformer, which as is well known in the art, is relatively large and bulky and has only moderate efficiency.

SUMMARY OF THE INVENTION

Briefly, the system of the invention includes a small current feedback transformer connected with its primary winding in series with the collector of a load switching transistor with the primary winding and the emitter of the switching transistor coupled across a power supply. The secondary of the current feedback transformer is connected from a reference potential to the center tap of a drive transformer through an isolating diode. A small starting current is also fed to the center tap of the drive transformer from a voltage source through a resistor and a diode path to overcome magnetizing currents. The ends of the primary winding of the drive transformer are returned to ground through an on gate and an off gate which are alternately operated from a control source to connect different sections of the primary winding of the drive transformer to the reference source. The secondary winding of the drive transformer is coupled between the base and the emitter of the main switching transistor. The system of the invention thus utilizes a proportion of the main switching transistor collector current for efficient control of the main transistor base current. The collector current is first stepped down through the feedback transformer to a lower level to decrease the saturation loss of the controlling devices and of the switching transistor and is then stepped back up through the drive transformer to the level proportional to the transistor gain required for driving the base of the switching transistor. During the period when the switching transistor is being turned on, the reduced collector current results in a base current which is a ratio to the collector current proportional to the turn ratios of the two transformers. When the switching transistor is being turned off and during the storage time of that transistor, a current proportional to the collector current is removed from the base of the switching transistor to reduce the storage time and greatly decrease the turnoff time. The system results in a highly efficient operation in controlling the main switching transistor.

It is therefore an object of this invention to provide a transistor switching circuit having a high degree of efficiency over a large range of load current variations.

It is another object of this invention to provide an efficient charging system operable with loads having wide variations of current requirements over a period of time.

Another object of this invention is to provide an improved circuit for charging a load such as a pulse forming network.

It is still another object of this invention to provide a high efficiency current feedback control system for repetitive charging operations in which substantially all of the elements utilize a minimum of current.

BRIEF DESCRIPTION OF THE DRAWINGS

These and other objects, features and advantages of the invention itself will become apparent to those skilled in the art in the light of the following detailed description taken in consideration with the accompanying drawings wherein like reference numerals indicate like or corresponding parts throughout the several parts.

DESCRIPTION OF THE PREFERRED EMBODIMENT

Figure 1:
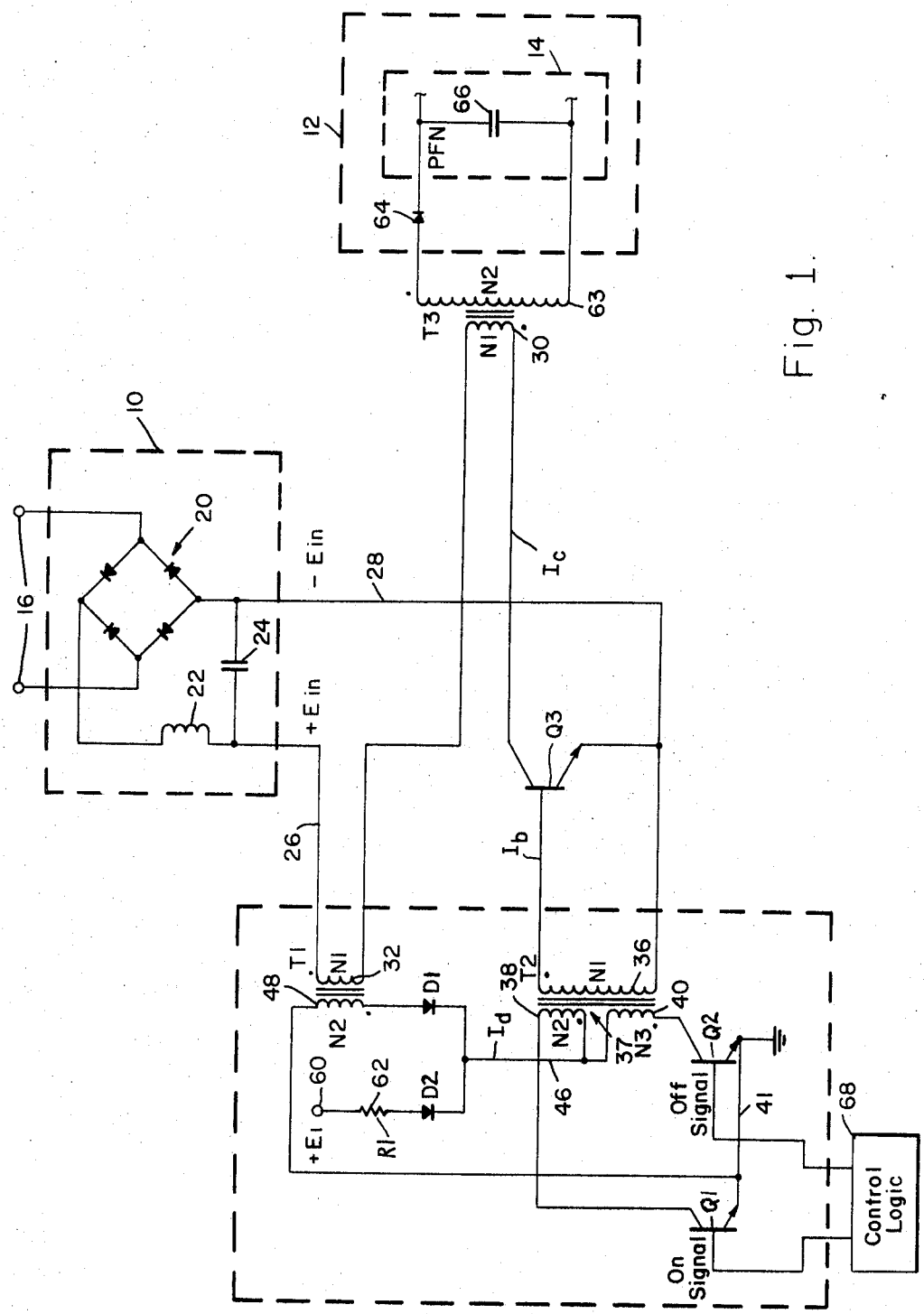
FIG. 1 is a schematic circuit and block diagram of the high efficiency current feed control system in accordance with the invention.

Referring first to FIG. 1, the control system of the invention is illustrated with an n-p-n type transistor Q3 controlling current conduction from a suitable power supply 10 to a load 12 which, for example, may be a pulse forming network (PFN) 14. The power supply for charging the pulse forming network may be, for example, a high efficiency fly-back voltage type, receiving AC (alternating current) voltage from a source 16 which is applied through a full-wave bridge rectifier 20 and through a filter including an inductor 22 and a capacitor 24 to leads 26 and 28 as respective voltages $+E_{in}$ and $-E_{in}$. The transistor Q3 has a collector coupled through a primary winding 30 of a load transformer T3 and through a primary winding 32 of a current feedback transformer T1 to the $+E_{in}$ lead 26. The emitter of the transistor Q3 is coupled to the $-E_{in}$ lead 28 of the power supply 10. The base to emitter path of the transistor Q3 is coupled through a winding 36 of a drive transformer T2, in turn having a primary winding 37 which includes winding sections 38 and 40. One of the ends of each of the windings 38 and 40 is coupled to the collector of the respective n-p-n type or switching transistor Q1 and off switching transistor Q2 for alternately connecting the winding sections to a reference potential such as ground on a lead 41. The other end of the windings 38 and 40 which is the center tap is coupled through a lead 46 to the cathode of a diode D1 having its anode coupled through a secondary winding 48 of the transformer T1 to the reference potential which may be ground. A voltage source $E_1$ at a terminal 60 is coupled through a resistor 62 having a value R1, and through the anode to cathode path of a diode D2 to the lead 46 to provide a small current to overcome the current feedback transformer and the drive transformer magnetized current.

The load transformer T3 has a suitable secondary winding 63 coupled to the load 12 and through an isolating diode 64 for charging a storage capacitor 66, when driving a pulse forming network, as is well known in the art. The on-off transistors Q1 and Q2, which instead of the transistors may be any suitable gating arrangement, are controlled by a suitable control logic source 68 which may provide a train of alternately repetitive positive and negative pulses, as is well known in the art. The transformer T2 has a polarity relation between the windings 38, 40 and 36 indicated by the dots so that transistor Q3 is biased into and out of conduction when transistors Q1 and Q2 are respectively biased into conduction. The transformer T1 has a polarity relation as shown by the dots so that a positive voltage on the lead 26 applies a positive voltage to the anode of the diode D1.

In operation, during the time that the on gate or the transistor Q1 is conducting to ground in response to a positive signal applied to the base of the transistor Q1, a starting current sufficient to overcome the magnetizing currents of the drive transformer T2 is furnished from the starting current source of the terminal 60. This current includes a forward drive current in the base to emitter of the transistor Q3 causing collector current to flow therethrough. The current feedback transformer T1 then takes over the switching operation and responds to cause a base current proportional to the collector current to flow into the base of the switching transistor Q3. The turn ratio N1/N2 of the transformer T1 and the turns ratio N2/N1 and N3/N1 of the transformer T2 are selected as a function of the β or gain parameter of the transistor Q3. Because this amount of current is supplied without dissipative elements in the current path and only in the quantity instantaneously needed by the power transistor Q3, the base drive is supplied at maximum efficiency. Thus, to achieve DC isolation and to reduce a current to a level easily controlled by the control gates Q1 and Q2, the current is first stepped down through current feedback transformer T1 and then is stepped back up to desired base control level through the drive transformer T2. The actual transformation levels are dependent on current levels in the windings N1 and N2 of the current feedback transformer T1 and N1, N2 and N3 of the drive transformer T2. For example, if a reduction of collector current to base drive current of 1 to 10 is to be achieved, N1 to N2 of T1 = 1 to 50 and N1 to N2 of T2 = N1 to N3 of T2 = 50 to 10. When the collector current is stepped down through current feedback transformer T1 with a ratio of N1 to N2 to a lower level, the saturation losses of the controlling devices Q1, Q2 and diode D1 are greatly decreased. The current is then stepped back up through drive transformer T2 with a ratio N2 or N3 to N1 to the voltage level required for the base drive of the switching transistor Q3 for the then conducting collector current.

During the time that the off gate or the transistor Q2 is conducting to ground, a reverse current proportional to collector current during the transistor storage period flows out of the base emitter junction of the transistor Q3 to reduce the power transistor switching and storage time. When the storage period of the power transistor Q3 has terminated, that is, the collector current is terminated, the reverse base current diminishes automatically to the low level sufficient to hold the device in the nonconductive or off state.

During the period that the power transistor Q3 is turned on or conductive, the flux build up in the high voltage transformer T3 is energy equal to $0.5LI^2$ where L is the self inductance of the primary winding of the transformer T3, which energy is stored in the self inductance. The saturation level of the transformer is set high enough to permit the stored energy per cycle to be at that value that permits the charge rate to fully charge the pulse forming network 14 in a predetermined time period. When the desired peak collector current is reached in some systems, a current sensing circuit may be utilized to control the control logic source 68 and turn the on gate off and the off gate on. In other arrangements in accordance with the invention, the control logic source 68 may operate at a fixed frequency. As a result of the transistor Q1 going out of conduction, the base current is no longer sufficient to the transistor Q3 to keep the transistor saturated and it is biased out of conduction. The turnoff of the transistor Q3 causes a voltage on the secondary winding 63 of the high voltage transformer T3 to now forward bias the rectifier diode 64 to supply the charging current to the pulse forming network 14. When the converter system is operated at a fixed frequency and the transformer T3 primary inductance is designed to require the full on period at the highest rectified peak voltage, the power supply draws a varying AC current as a full way rectified voltage increases from zero volts to the peak voltage. For the constant frequency operation, peak current for the on period varies proportional to the input voltage. The result is that current pulses are utilized increasing in amplitude with the sine wave voltage applied at the source 16.

Figure 2:
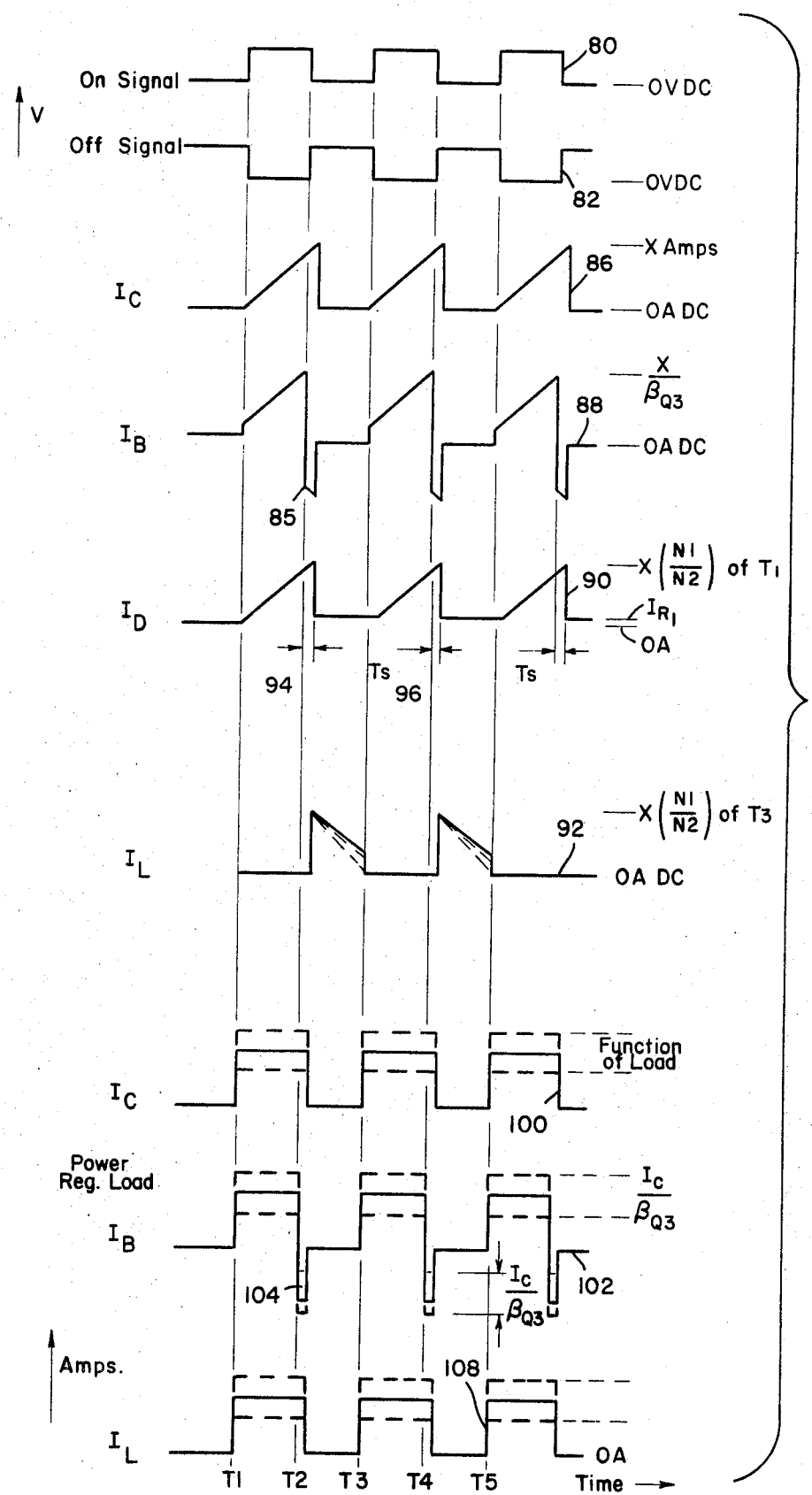
FIG. 2 is a schematic diagram of waveforms of current and voltage as a function of time for explaining the operation of the system of FIG. 1.

Referring now also to the waveforms of FIG. 2, the on signal of a waveform 80 and the off signal of a waveform 82 provide alternate positive and negative pulses to the bases of respective transistors Q1 and Q2 which in the illustrated arrangement may occur at any fixed frequency. During a first period starting with a time T1 which is an on period, collector current $I_c$ of the transistor Q3 shown by waveform 86 increases along with the base current $I_b$ of a waveform 88 to a time T2 at which time the base current $I_b$ decreases to a negative value at 85 in response to the fall of the on signal of the waveform 80. Shortly thereafter, the base current $I_b$ of the waveform 88 increases to the zero ampere level and the collector current $I_c$ of the waveform 86 falls to the zero current level. In the times between T1 and T2 the diode current $I_d$ increases and falls in response to the fall of the collector current of the waveform 86. During the off time of the positive pulse of the waveform 82 starting with time T3, the collector current of the waveform 86 remains zero and the load current $I_L$ of the waveform 92 operating with a PFN type load decreases from a built up value to a substantially zero volts. The load current $I_L$ of the waveform 92 has different rates of current discharge as indicated by the dotted lines. The peak value of the collector current $I_c$ of the waveform 86 has a value X amps and the peak value of the base current $I_b$ of the waveform 88 has a value $X/\beta$ Q3. The peak value of the diode current $I_d$ of the waveform 90 has a value of $X(N1/N2)$ for transformer T1. At a minimum or low value, the diode current $I_d$ has a value I through $R_1$ which is slightly above the 0 ampere current level. The load current $I_L$ peak value of the waveform 92 has a value X over the turns ratio of the load transformer T3. It is to be noted that the negative spike such as at 85 of the base current $I_b$ of the waveform 88 substantially reduces the transistor storage time $T_s$ to a small value indicated by the period 94 and 96 at the waveform 90. The operation continues in a similar manner at times T4 and T5, being repetitively performed in response to the control logic circuit 68.

For operation when the load 12 is a conventional load such as to be found with a regulator power supply system, the current $I_c$ of a waveform 100 may have a square current pulse which varies over a range indicated as dotted amplitudes, which range may be a function of the characteristics of the load. Base current $I_b$ of a waveform 102 may have a substantially rectangular configuration with a negative spike such as 104 with both the peak amplitude and the negative spike varying as a function of the collector current over $\beta$ or ($I_c/\beta Q$). The load current $I_L$ of a waveform 108 with the regulator load may occur during the on periods such as between times T1 to T2, as a rectangular waveform having a peak amplitude variation indicated by dotted lines. In the off period such as between times T2 and T3 both the collector current, the base current and the load current may be zero in this arrangement. It is to be understood that the principles of the current feedback control system of the invention are not to be limited to any particular load arrangement or power supply but are equally applicable to any suitable configuration. Further, it is to be understood that the switching system of the invention is not to be limited to use of p-n-p type transistors but may utilize all or part n-p-n type transistors or equivalent switching and control units.

Thus, the system of the invention provides a highly efficient operation by controlling the main transistor Q3 with a base current proportional to the load current. The required external power other than a percentage of its own collector current is the small current furnished through resistor R1 and diode D2 to overcome the current feedback transformers magnetized current. The system provides a percentage of the collector current into the base during the on period and rapidly removes a percentage of the collector current out of the base of the switching transistor during the transistor storage period. The result of using this percentage of collector current during both the on and off periods provides a substantially high drive efficiency. Further, the current feedback transformers of the system of the invention serve as DC isolation transformers so as to isolate the control and drive circuitry from the main power source. One result of this isolation in some systems in accordance with the invention is that the conventional fly-back pulse forming network charge power is supplied into full wave bridge rectified lines without the requirement of a 60 or 400 cycle isolation transformer.

What is claimed is:

1. Apparatus for charging a load through a diode in a secondary winding of a first transformer comprising
   a source of power,
   a switching transistor having a collector, emitter and base with the collector coupled to a first end of a primary winding of said first transformer and the emitter coupled to said source of power,
   a current feedback transformer having a primary winding with one end coupled to the primary winding of the first transformer and the other end coupled to said source of power,
   a drive transformer having first and second primary windings with a first end of each coupled to a secondary winding of said current feedback transformer and having a secondary winding coupled to the base and the emitter of said switching transistor, and
   on-off switching means coupled to second ends of the primary windings of said drive transformer.

2. The combination of claim 1 further including a current source coupled to the first ends of said first and second windings of said drive transformer.

3. The combination of claim 2 in which said switching transistor is an n-p-n type transistor and said on-off switching means includes first and second n-p-n type transistors coupled to the second ends of the primary windings of said drive transformer.

4. A circuit for charging a load comprising
   a source of power,
   a switching transistor having first and second load terminals and a control terminal with the first load terminal coupled to said source of power,
   a load transformer coupled to said load and having a primary winding with one end coupled to the second load terminal of said switching transistor,
   a current feedback transformer having a primary winding and a secondary winding with the primary winding coupled between the source of power and a second end of the primary winding of said load transformer, a drive transformer having first and second primary windings and a secondary winding with first ends of said primary windings coupled to a first end of the secondary winding of said current feedback transformer, said secondary winding of said drive transformer being coupled between the control terminal and the first load terminal of said switching transistor, a source of reference potential coupled to a second end of the secondary winding of said current feedback transformer, and switching means coupled between second ends of said primary windings of said drive transformer and said source of reference potential.

5. The combination of claim 4 in which a diode is coupled between the secondary winding of said current feedback transformer and the first ends of the primary windings of said drive transformer.

6. The combination of claim 5 in which a current source is coupled to the first ends of the primary windings of said drive transformer.

7. The combination of claim 6 in which said current source includes a resistor and a diode.

8. The combination of claim 4 in which said switching means includes first and second transistors having load current paths and control terminals with their load current paths coupled between the second ends of the primary windings of said drive transformer and said source of reference potential and includes control means coupled to the control terminals of said first and second transistors to alternately bias one into conduction and one out of conduction.

9. The combination of claim 8 in which said switching transistor is an n-p-n type.

10. The combination of claim 9 in which the load is a pulse forming network and in which a rectifier is coupled between a secondary winding of said load transformer and said pulse forming network so as to be reverse-biased when said switching transistor is conducting.

* * * * *